United States Patent [19]

Lemberger et al.

[11] Patent Number: 5,473,400
[45] Date of Patent: Dec. 5, 1995

[54] RESEALABLE FILM CARTRIDGE FOR A LASER IMAGER

[75] Inventors: Richard R. Lemberger, Columbus Township, Anoka County, Minn.; Naoyuki Matsuda, Sagamihara, Japan; Sadanobu Murasaki, Ishihara, Japan; Hajime Takei, Sagamihara, Japan; Stuart J. Wyman, Minneapolis, Minn.

[73] Assignee: Minnesota Mining and Manufacturing Company, St. Paul, Minn.

[21] Appl. No.: 380,076

[22] Filed: Jan. 30, 1995

Related U.S. Application Data

[63] Continuation of Ser. No. 155,086, Nov. 19, 1993, abandoned, which is a continuation of Ser. No. 3,949, Jan. 15, 1993, abandoned, which is a continuation of Ser. No. 915,030, Jul. 16, 1992, abandoned, which is a continuation of Ser. No. 656,610, Feb. 19, 1991, abandoned.

[51] Int. Cl.$^6$ ............................................. G03B 17/26
[52] U.S. Cl. ..................................................... 354/277
[58] Field of Search ................................ 354/275, 277, 354/174, 307; 355/72; 206/455; 430/471

[56] References Cited

U.S. PATENT DOCUMENTS

| | | | |
|---|---|---|---|
| 330,182 | 11/1885 | Wilcox | 206/456 |
| 1,098,844 | 6/1914 | Schumuck | 354/277 X |
| 1,536,345 | 5/1925 | Jones et al. | 206/455 X |
| 2,894,141 | 7/1959 | Kollock | 354/277 |
| 3,971,470 | 7/1976 | White | 206/455 |
| 4,727,391 | 2/1988 | Tajima et al. | 354/277 |
| 4,799,591 | 1/1989 | Tajima et al. | 206/455 |
| 4,802,618 | 2/1989 | Seto et al. | 206/455 |
| 4,853,724 | 8/1989 | Tajima et al. | 354/277 |
| 4,860,042 | 8/1989 | Tajima et al. | 354/277 |
| 4,876,706 | 10/1989 | Tajima | 354/277 |
| 5,008,694 | 4/1991 | Tajima et al. | 354/277 |
| 5,049,924 | 9/1991 | Moro et al. | 355/50 |
| 5,051,775 | 9/1991 | Yamakoshi et al. | 355/72 |
| 5,084,728 | 1/1992 | Horikiri et al. | 354/277 |
| 5,090,677 | 2/1992 | Yamakoshi et al. | 271/117 |
| 5,097,273 | 3/1992 | Moro et al. | 346/134 |
| 5,100,121 | 3/1992 | Takei et al. | 271/104 |
| 5,104,111 | 4/1992 | Matsuda et al. | 271/110 |
| 5,127,646 | 7/1992 | Matsuda et al. | 271/145 |
| 5,132,724 | 7/1992 | Lemberger et al. | 354/275 |
| 5,149,078 | 9/1992 | Matsuda et al. | 271/145 |
| 5,169,137 | 12/1992 | Matsuda et al. | 271/145 |

FOREIGN PATENT DOCUMENTS

| | | |
|---|---|---|
| 0306982 | 3/1989 | European Pat. Off. . |
| 56-5141 | 1/1981 | Japan . |
| 56-7931 | 1/1981 | Japan . |
| 61-192630 | 8/1986 | Japan . |
| 62-62356 | 3/1987 | Japan . |
| 62-65840 | 3/1987 | Japan . |
| 62-70120 | 3/1987 | Japan . |
| 62-86359 | 4/1987 | Japan . |

(List continued on next page.)

OTHER PUBLICATIONS

"Fundamentals of X-ray Physics & Technique", Publication of the U.S. Naval Medical School Center, 1958, pp. i, ii, 208, 379–382. No month given.

*Primary Examiner*—David M. Gray
*Attorney, Agent, or Firm*—Gary L. Griswold; Walter N. Kirn; Charles D. Levine

[57] ABSTRACT

A resealable cartridge for sheets of photographic film includes a one-piece, photo-inert and optically opaque polymer tray. The tray has a generally planar bottom wall and front, back and side walls with upper edges and outwardly extending lips. The lip extending from the front wall includes a series of spaced cut-outs. A flexible, photo-inert and optically opaque foil laminate cover for the tray has front, back and side edges. The front edge of the cover includes spaced opening/closing mechanism-engaging apertures which overlie the cutouts in the front lip of the tray. Photo-inert and optically opaque adhesive segments on the lips of the tray provide a resealable opaque seal between the edges of the cover and lips of the tray.

32 Claims, 6 Drawing Sheets

FOREIGN PATENT DOCUMENTS

| | | |
|---|---|---|
| 62-161637 | 7/1987 | Japan . |
| 62-129545 | 8/1987 | Japan . |
| 62-132553 | 8/1987 | Japan . |
| 62-205340 | 9/1987 | Japan . |
| 62-245246 | 10/1987 | Japan . |
| 62-249146 | 10/1987 | Japan . |
| 62-265664 | 11/1987 | Japan . |
| 63-11936 | 1/1988 | Japan . |
| 63-113444 | 5/1988 | Japan . |
| 1-111239 | 7/1989 | Japan . |
| 2-216144 | 8/1990 | Japan . |
| 1-216142 | 8/1990 | Japan . |
| 2-216143 | 8/1990 | Japan . |
| 2-221039 | 9/1990 | Japan . |
| 2-306240 | 12/1990 | Japan . |
| 3-33840 | 2/1991 | Japan . |
| 3-152027 | 6/1991 | Japan . |
| 3-162347 | 7/1991 | Japan . |
| 3-162337 | 7/1991 | Japan . |
| 3-162345 | 7/1991 | Japan . |
| 3-162348 | 7/1991 | Japan . |
| 3-177244 | 8/1991 | Japan . |
| 3-200635 | 9/1991 | Japan . |
| 3-200633 | 9/1991 | Japan . |
| 3-200634 | 9/1991 | Japan . |
| 4-80126 | 3/1992 | Japan . |
| 4-80133 | 3/1992 | Japan . |
| 5-24668 | 2/1993 | Japan . |
| 5-24670 | 2/1993 | Japan . |
| 5-24671 | 2/1993 | Japan . |
| 5-24669 | 2/1993 | Japan . |
| PCT/EP88/00166 | 9/1988 | WIPO . |

RESEALABLE FILM CARTRIDGE FOR A LASER IMAGER

This application is a continuation application of U.S. application Ser. No. 08/155,086, filed Nov. 19, 1993, now abandoned; which is a continuation application of U.S. application Ser. No. 08/003,949, filed Jan. 15, 1993, now abandoned; which is a continuation application of U.S. application Ser. No. 07/915,030, filed Jul. 16, 1992, now abandoned; which is a continuation application of U.S. application Ser. No. 07/656,610, filed Feb. 19, 1991, now abandoned.

BACKGROUND OF THE INVENTION

The present invention relates generally to packaging for photographic film. In particular, the present invention is a resealable cassette or cartridge for medical imaging film.

X-ray and other types of medical imaging photographic film are typically packaged in optically opaque (i.e., light-tight) and photo-inert containers such as cassettes, magazines, cartridges and bags. The Wilcox U.S. Pat. No. 330,182, the Jones et al. U.S. Pat. No. 1,536,345 and the 1958 U.S. Naval Medical School publication entitled "Fundamentals of X-ray Physics & Technique" disclose a variety of containers for film storage and transportation. Medical imaging film commercially available from the 3M Company of St. Paul, Minn., the assignee of the present invention, is packaged in a flexible bag including layers of biaxially oriented polypropylene, aluminum foil and low density polyethylene which are laminated together by polyethylene bonding layers. The film must be removed from these packages and loaded into the x-ray machine, camera or other imaging device under darkroom conditions, an inconvenient procedure.

The Schmuck U.S. Pat. No. 1,098,844 discloses a film package which can be loaded directly into a camera, thereby alleviating the need for a darkroom. However, the Schmuck film package is relatively inefficient in design and requires manual manipulation to bring the film into exposure position. The Schmuck package is therefore incompatible with the automatic film handling mechanisms of modern imaging systems.

The Tajima et al. U.S. Pat. No. 4,727,391 discloses a package for sheet film and a loading device for the package. The package includes a tray and a flexible cover peelably attached to the tray by an adhesive. After the package is loaded into a loading device of an image recorder, the cover is peeled off, enabling a delivery mechanism to access the film. The adhesive layer has an edge portion inclined to the longitudinal direction of the tray so the cover can be peeled off easily.

Packages of the type shown in the Tajima et al. Patent typically contain many sheets of one specific type of film. However, depending on the nature of the image being exposed, it is often necessary to load different sizes and/or types of film into the imager. Any unexposed film remaining within a cartridge is therefore wasted if the cartridge must be removed from the imager so a new cartridge bearing a different type or size of film can be inserted.

International application Number PCT/EP88/00166 discloses an automatic film-loading device for sheet film cassettes. After a cassette is inserted into an unloading and reloading station in the device, the cassette is opened and the exposed sheet of film is seized, removed and transported to a developing apparatus. The cassette is then reloaded with a sheet of film from one of a plurality of supply magazines, each containing different sizes of film. The freshly loaded cartridge is then dispensed from the device for subsequent use. Although this automatic film-loading device reduces the waste associated with the removal of unused film from an imager, it is a complicated and relatively expensive accessory for the imager.

It is evident that there is a continuing need for improved film handling systems for photographic imagers. In particular, there is a need for a device which conveniently enables different sizes and/or types of film to be inserted into and removed from a medical imager without resulting waste. The device must be relatively inexpensive to be commercially viable.

SUMMARY OF THE INVENTION

The present invention is a relatively inexpensive and convenient to use resealable cartridge for photosensitive media. The cartridge includes a photo-inert and optically opaque tray with a media access opening, and a flexible, photo-inert and optically opaque cover over the opening. There is an optically opaque and photo-inert seal between the cover and tray. The seal includes an openable and resealable adhesive seal between at least portions of the cover and tray.

In one embodiment, the tray is a one piece polymer member including a generally planar bottom wall, front, back and side walls with upper edges, and lips extending from the upper edges of the walls. The cover includes front, back and side edges. The adhesive seal is pressure sensitive or coated liquid adhesive extending in a closed path around the lips of the tray.

In yet another embodiment, the lip on the front wall of the tray includes cutouts. The front edge of the cover includes apertures which overlie the cutouts permitting the cover to be engaged by an opening/closing mechanism.

DETAILED DESCRIPTION OF THE PREFERRED EMBODIMENTS

Figures 1, 8:
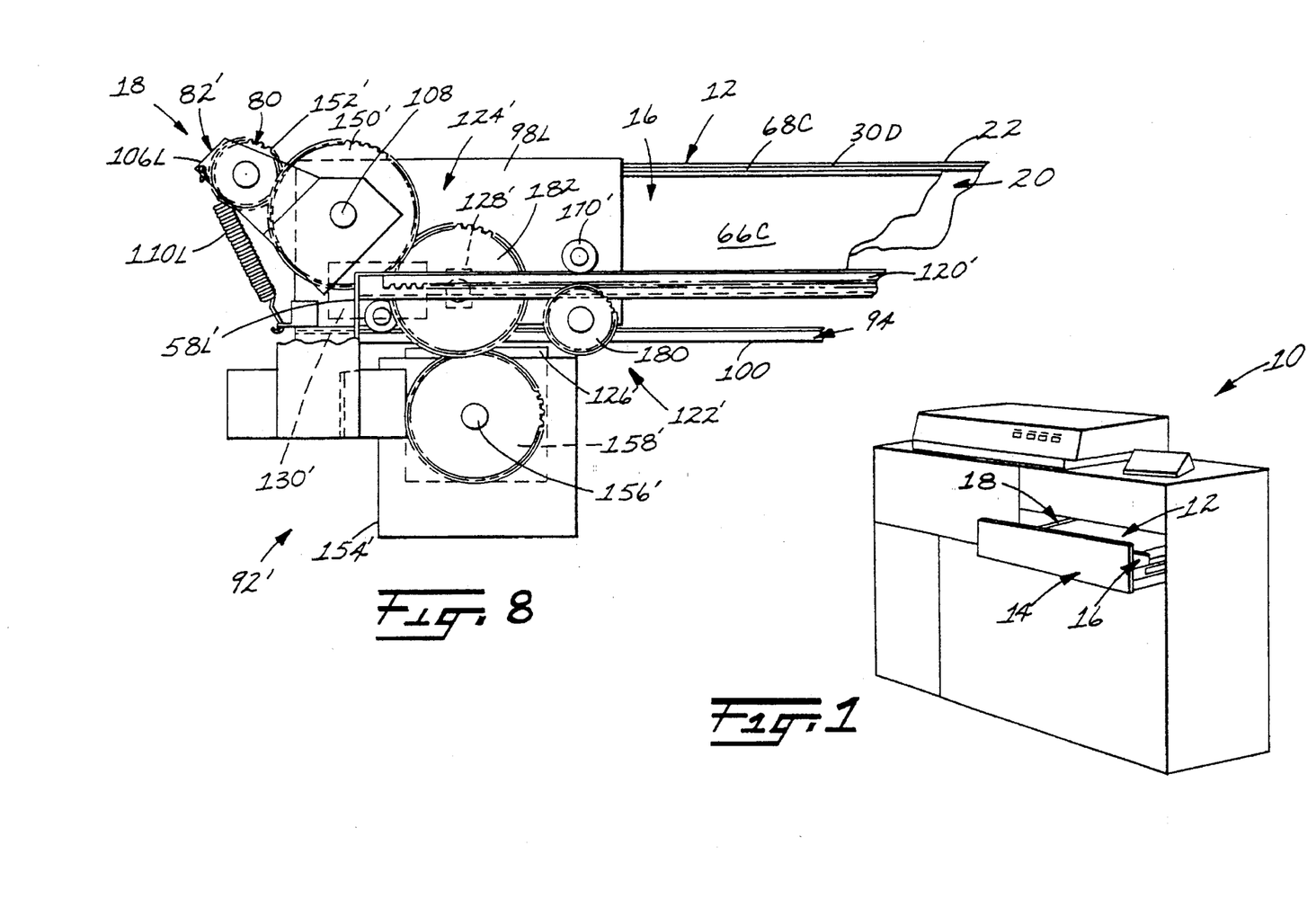
FIG. 1 is an illustration of a laser imager configured for use with a resealable film cartridge of the present invention.
FIG. 8 is a side view of a portion of an alternative embodiment of the opening/closing mechanism.

FIG. 1 is an illustration of a digital laser imager 10 which is configured to operate with a resealable photographic film cartridge 12 in accordance with the present invention. In the embodiment shown, laser imager 10 includes a drawer 14 which is opened to provide access to a cartridge-receiving base 16 into which film cartridge 12 is loaded. A cartridge opening/closing mechanism 18 is also mounted to drawer 14. After a film cartridge 12 has been loaded into base 16, drawer 14 is closed to seal the cartridge within a light-tight compartment. Opening/closing mechanism 18 then opens cartridge 12 to permit access to sheets of film (not visible in FIG. 1) in the cartridge. Sheets of film are removed from the opened cartridge 12 and imaged by other subsystems (not shown) of laser imager 10. The imaged film is temporarily stored in a magazine (not shown) before being removed from imager 10 for subsequent processing. Alternatively, the imaged film can be automatically fed to a docked or attached film developer (not shown) for processing.

Opening/closing mechanism 18 is also actuated to close cartridge 12 before the cartridge is removed from imager 10. Since cartridge 12 is resealable, it can be removed from imager 10 before all the film within the cartridge has been exposed. Cartridges 12 with different sizes or types of film media can therefore be conveniently loaded into and removed from laser imager 10 as needed, without wasting any unused film remaining within the cartridge.

Figure 2:
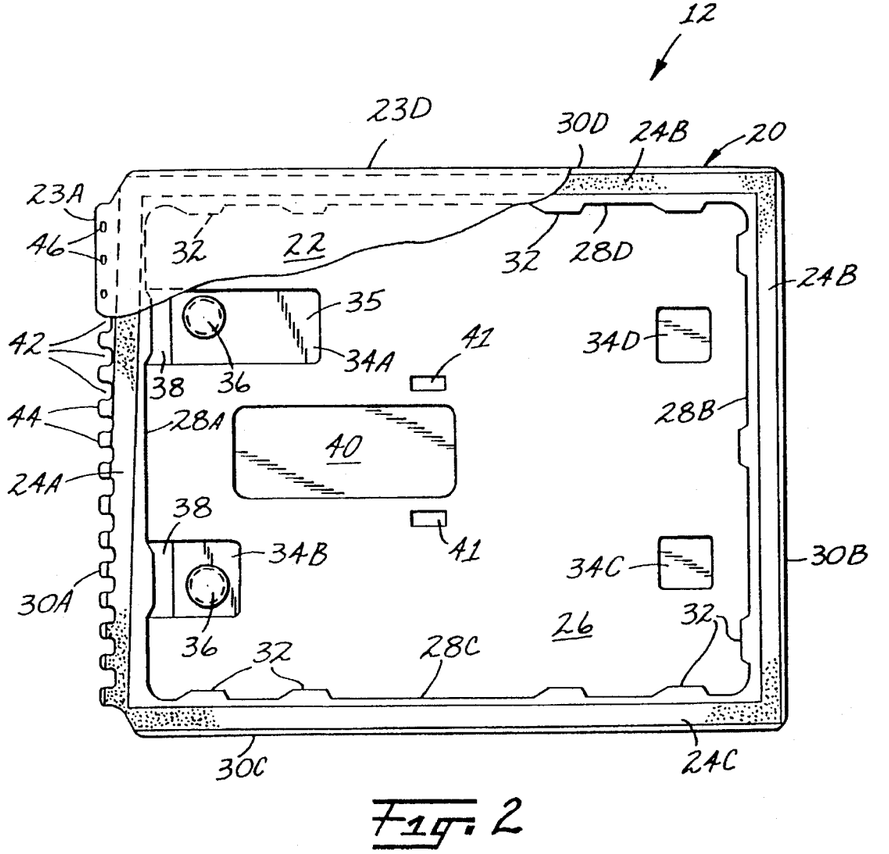
FIG. 2 is top view of a resealable film cartridge in accordance with the present invention, with a portion of the cover broken away.
Figure 3:
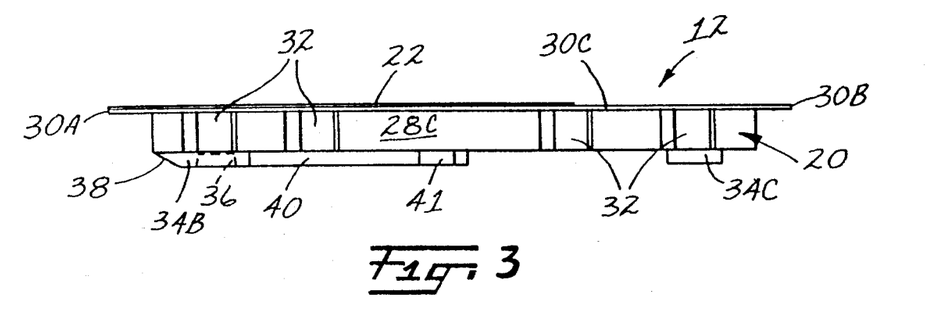
FIG. 3 is a side view of the cartridge shown in FIG. 2.

Resealable cartridge 12 can be described in greater detail with reference to FIGS. 2 and 3. As shown, cartridge 12 includes a optically opaque polymer film-receiving tray 20 and a flexible, optically opaque polymer cover 22. Cover 22 is resealably mounted to tray 20 by adhesive segments or strips 24A–24D. Tray 20 is preferably molded in one piece from a relatively inexpensive and photo-inert polyolefin material so that it is economically feasible to dispose of the cartridge following a single use. In one embodiment tray 20 is molded from 555-ABS material which is commercially available from the Dow Chemical Company. Polystyrene materials having appropriate characteristics can also be used.

Tray 20 is a relatively shallow member and includes a generally planar bottom wall 26, front wall 28A, rear wall 28B and side walls 28C and 28D. Lips 30A–30D extend outwardly from the upper edges of respective walls 28A–28D, and circumscribe a film access opening of tray 20. Inwardly projecting guides 32 are formed on walls 28A–28D to properly position sheets of film (not shown) within tray 20. Feet 34A–34D are formed into and extend downwardly from bottom wall 26 to support cartridge 12 within base 16 of laser imager 10. Bottom wall 26 also includes positioning recesses 36 which can be tapered and extend into tray 20 from the side of the bottom wall opposite walls 28A–28D (i.e., from the exterior side of the tray). Positioning recesses 36 are configured to receive positioning lugs (FIG. 5A) extending from base 16. The positioning lugs secure and properly orient cartridge 12 within laser imager 10. In the embodiment shown, positioning recesses 36 are molded into feet 34A and 34B adjacent to front wall 28A. A media presence monitoring well 35 is also formed in bottom wall 26. Media presence monitoring sensors of imager 10 (not shown) extend into well 35 below the surface of bottom wall 26 when all film has been removed from tray 20.

Feet 34A and 34B (i.e., those adjacent to front wall 28A) also include ramp surfaces 38 which slope downwardly from the lower edge of the front wall to the bottom of the feet. Ramp surfaces 38 guide feet 34A and 34B over the positioning lugs in imager base 16 as cartridge 12 is being loaded into the base. The embodiment of tray 20 illustrated in FIGS. 2 and 3 also includes a recess 40 in bottom wall 26 which forms a platform on the bottom exterior of tray 20. The platform formed by recess 40 is configured to receive an information bearing medium such as a bar code which includes recorded information pertaining to the characteristics of film within cartridge 12. A pair of feet 41 are formed as recesses in bottom wall 26 adjacent recess 40 to insure proper positioning of the information bearing medium with respect to a reading device (not shown) of laser imager 10. Reinforcing ribs (not shown in FIGS. 2 and 3) can also be molded into bottom wall 26 and/or side walls 28A–28D to increase the rigidity of tray 20.

The forwardmost or leading edge of front lip 30A also includes a series of evenly spaced cut-out sections 42. Cut-out sections 42 form a series of spaced projections 44 on the leading edge of lip 30A. Cut-out sections 42 and projections 44 cooperate with yet to be described aspects of cover 22 and opening/closing mechanism 18 to facilitate the opening and subsequent closing of cartridge 12.

Cover 22 is a flexible, photo-inert and optically opaque sheet of material sized to extend over the access opening of tray 20. Cover 22 has edges 23A–23D (only edges 23A and 23D are shown in FIG. 2) which extend between and mate with tray lips 30A–30D, respectively. In one embodiment, cover 22 is a foil laminate formed by polyethylene bonded layers of one mil thick polyethylene, thirty five hundredths mil thick aluminum foil and two mil thick polypropylene. This foil laminate cover 22 is of a sufficiently stretchy nature to prevent the cover from popping off tray 20 when cartridge 12 is flexed, yet rigid enough to prevent detrimental amounts of stretch related buckling when the cover is rolled up. The foil laminate cover 22 also provides for the integrity of a vacuum within cartridge 12.

A paper or polyester reinforcing strip (not separately shown) can be added to the leading or front edge 23A of cover 22 to increase cover rigidity above projections 44 and facilitate the operation of opening/closing mechanism 18. In one embodiment, the reinforcing strip is a one quarter inch wide, six mil thick, strip of mylar. The front edge 23A of cover 22 extends over the tray cut-out sections 42, and includes elongated apertures 46 which are positioned over the cut-out sections when the cover is sealed onto tray 20. Apertures 46 facilitate the engagement of opening/closing mechanism 18 with cover 22 in a manner described below.

Adhesive segments or strips 24A–24D can be a coated liquid adhesive. In one embodiment the liquid adhesive is an emulsion based acrylic polymer, such as that disclosed in the Brown et al. U.S. Pat. No. 4,629,663, mixed with 40% Aquatac 6085 tackifier commercially available from Arizona Chemicals of Panama City, Fla. Alternatively, strips 24A–24D can be portions of a one-piece adhesive gasket applied to lips 30A–30D from a transfer liner. By way of example, strips 24A–24D of the gasket can be pressure sensitive adhesive (PSA) such as 9460 Transfer Adhesive which is commercially available from the 3M Company of St. Paul, Minn. Adhesive strips 24A–24D are photo-inert and provide a optically opaque and resealable seal between tray 20 and cover 22. Adhesive strips 24A–24D tend to more aggressively adhere to tray 20, so they will remain on lips 30A–30D when cover 22 is peeled away. As shown in FIG. 2, adhesive strip 24A extends over at least a portion of projections 44 so the leading edge 23A of cover 22 is releasably but securely held to lip 30A to facilitate trouble-free operation of opening/closing mechanism 18. The forwardmost edge of adhesive strip 24A can also be oriented at a non-parallel angle with respect to the front edge of lip 30A, and therefore at a non-perpendicular angle with respect to lips 30C and 30D (i.e., at a non-perpendicular angle with respect to the path of motion of the cover as it is opened and resealed). This orientation enables the front or forward edge of cover 22 to be more easily peeled away from lip 30A by opening/closing mechanism 18.

Figure 4:
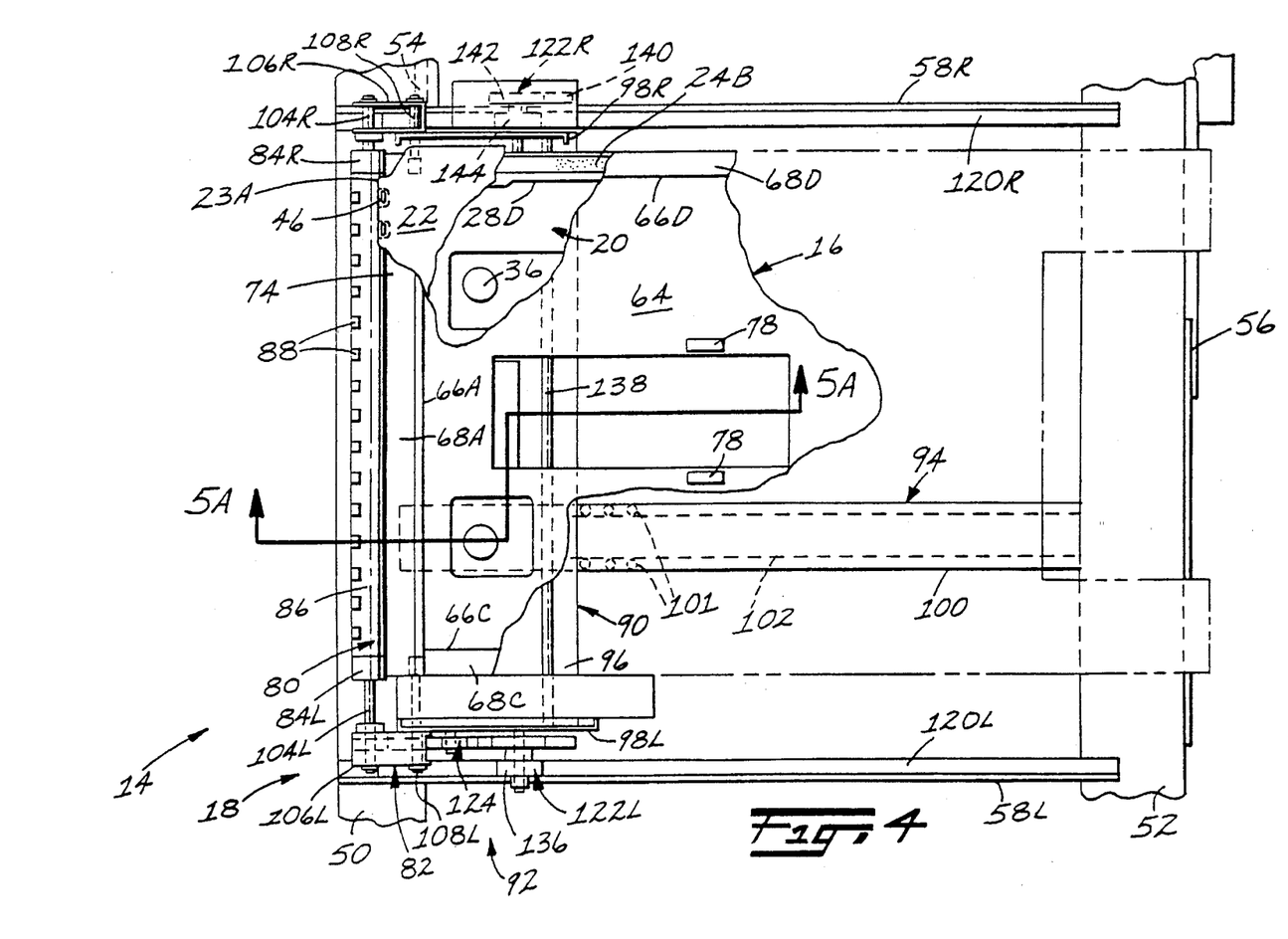
FIG. 4 is a top view of an opening/closing mechanism for the cartridge with a portion of the cartridge broken away and shown loaded in the mechanism.

Base 16 and opening/closing mechanism 18 are described in greater detail with reference to FIGS. 4, 5A–5C, 6 and 7. As shown in FIG. 4, drawer 14 includes inverted U-shaped frame members 50 and 52. Frame members 50 and 52 are mounted for reciprocal linear motion into and out of the light-tight compartment of laser imager 10 by telescopic slide tracks 54 and 56, respectively. Additional structural support is provided by cross members 58L and 58R which extend between frame members 50 and 52 at spaced locations. Base 16 is mounted to drawer 14 by brackets 62 and includes bottom wall 64, front wall 66A and side walls 66C and 66D.

Lips 68A, 68C and 68D extend outwardly from the upper edges of base walls 66A, 66C and 66D, respectively (i.e., from the edges opposite bottom wall 64). As is perhaps best shown in FIGS. 5A–5C, forward lip 68A includes a portion 70 adjacent forward pan wall 66A which is flush with side lips 66C and 66D, and a lower, outwardly extending support portion 72. A strip 74 of resilient material is mounted to outwardly extending portion 72, and has its upper surface flush with lips 66C and 66D. Base 16 also includes a pair of positioning lugs 76 which extend upwardly from bottom wall 64. Positioning lugs 76 can be tapered and are sized to fit within recesses 36 of cartridge tray 20. A pair of tray supports 78 also extend from bottom wall 64 of pan 16 and are oriented in such a manner as to be positioned under and support projections 41 of cartridge tray 20.

During use, film cartridge 12 is loaded into opened drawer 14 by sliding the cartridge, front lip 30A first, into base 16 toward front lip 68A. As cartridge 12 approaches its proper position in base 16, ramp surfaces 38 will engage positioning lugs 76 causing feet 34A and 34B to be raised over the lugs and causing forward lip 30A to be raised over front pan lip 68A. With continued motion cartridge 12 will drop into its loaded position with feet 34A and 34B resting on bottom pan wall 64, cartridge lips 30A, 30C and 30D resting on base lips 68A, 68C and 68D respectively, and positioning lugs 76 extending into tray recesses 36. Cartridge 12 is thereby securely and accurately positioned within base 16.

After cartridge 12 has been loaded into base 16 in the manner described above, drawer 14 is closed. Cartridge 12 is then opened, and closed or resealed, by opening/closing mechanism 18. Opening/closing mechanism 18 includes pressure roller 80 and roller drive mechanism 82. Roller 80 is an elongated member having ends 84L and 84R of circular cross section aligned with base lips 68C and 68D, respectively. Pressure roller 80 also includes a cut-out or wrapping portion 86 which extends between ends 84L and 84R. Wrapping portion 86 has a perimeter which is less than the circumference of ends 84L and 84R, and is half circular in cross section in the embodiment shown. A plurality of cover-engaging fingers 88 extend from wrapping portion 86 of pressure roller 80. In the embodiment shown, fingers 88 are curved. Fingers 88 and wrapping portion 86 of pressure roller 80 both have a radius of curvature equal to the radius of ends 84L and 84R. Fingers 88 are sized and spaced to fit within apertures 46 in the front edge of cartridge cover 22.

Roller drive mechanism 82 includes a carriage 90 and associated drive assembly 92. Drive assembly 92 causes carriage 90 and pressure roller 80 to be reciprocally driven along a linear path of motion through cartridge opening strokes and cartridge closing strokes. Carriage 90 is guided along the path of motion by guide track 94.

Carriage 90 includes an elongated base plate 96 having a pair of uprights 98L and 98R at its opposite ends. Base plate 96 extends in a direction generally transverse to the path of motion of carriage 90, and is positioned below base 16. Uprights 98L and 98R extend upwardly from baseplate 96 at locations beyond the outer edges of base lips 68C and 68D, respectively. Guide track 94 includes an elongated track member 100 oriented parallel to the carriage path of motion and having its opposite ends mounted to drawer frame members 50 and 52. Guide track 94 also includes a slide member 102. Slide member 102 is mounted to the lower side of carriage base plate 96 and is slidably engaged with track member 100 by means of bearings 101.

Figures 5A, 5B:
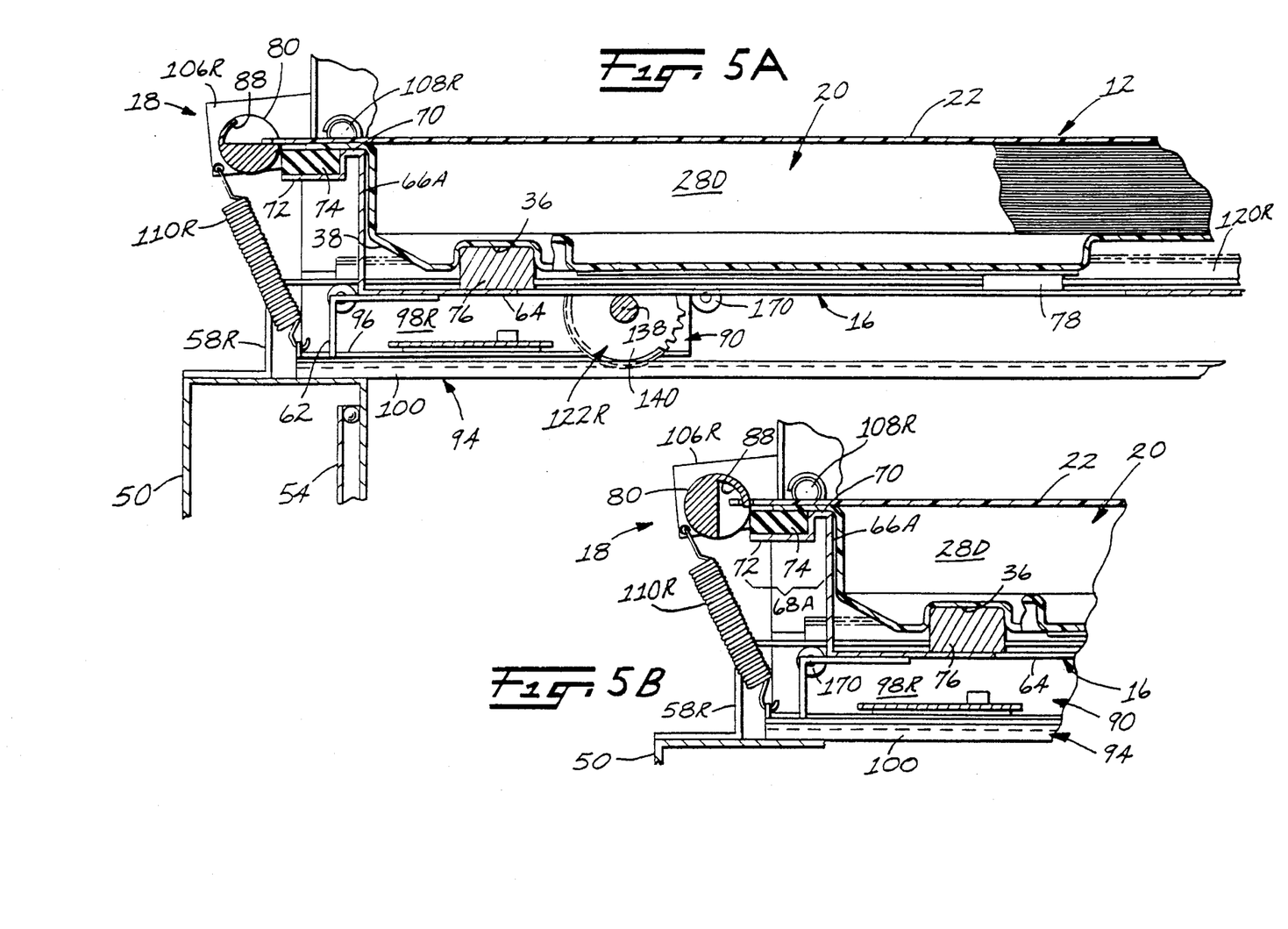
FIG. 5A is a sectional side view of a portion of the opening/closing mechanism shown in FIG. 4.
FIG. 5B is a sectional side view of a portion of the opening/closing mechanism shown in FIG. 4, with the pressure roller engaging the cartridge cover.
Figure 5C:
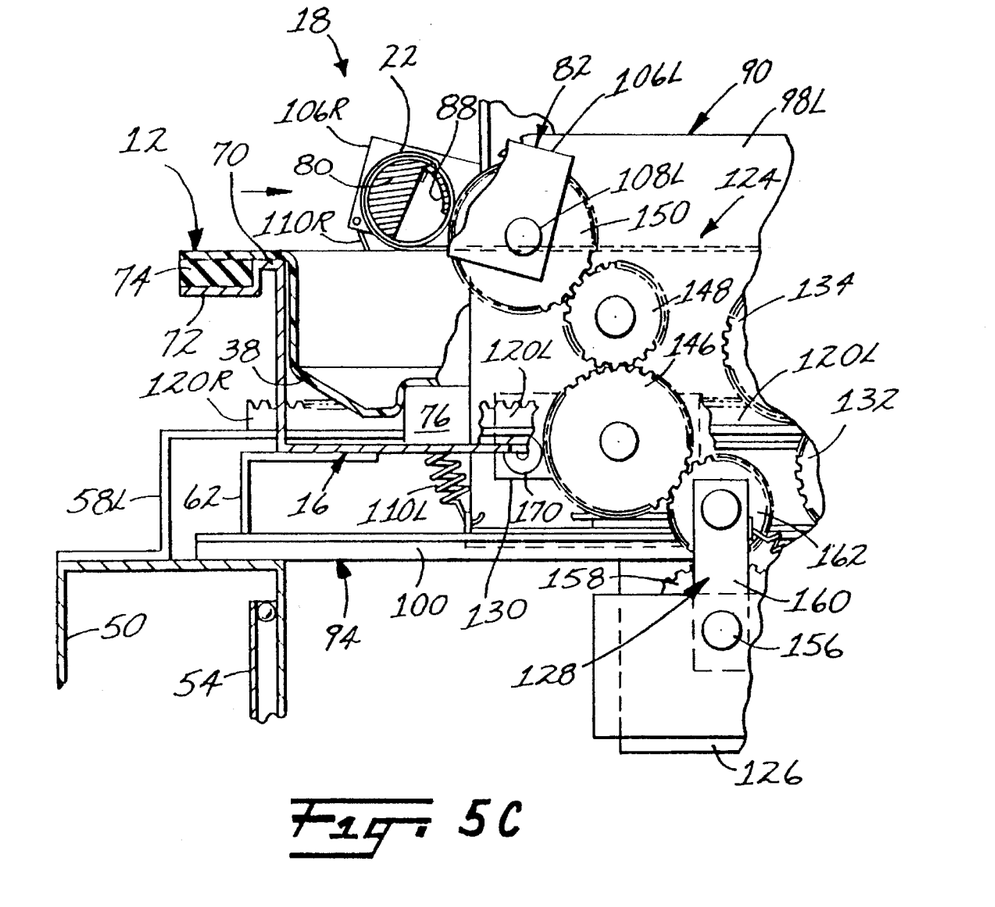
FIG. 5C is a sectional side view of a portion of the opening/closing mechanism shown in FIG. 4, with the cover partially removed from the cartridge.
Figure 6:
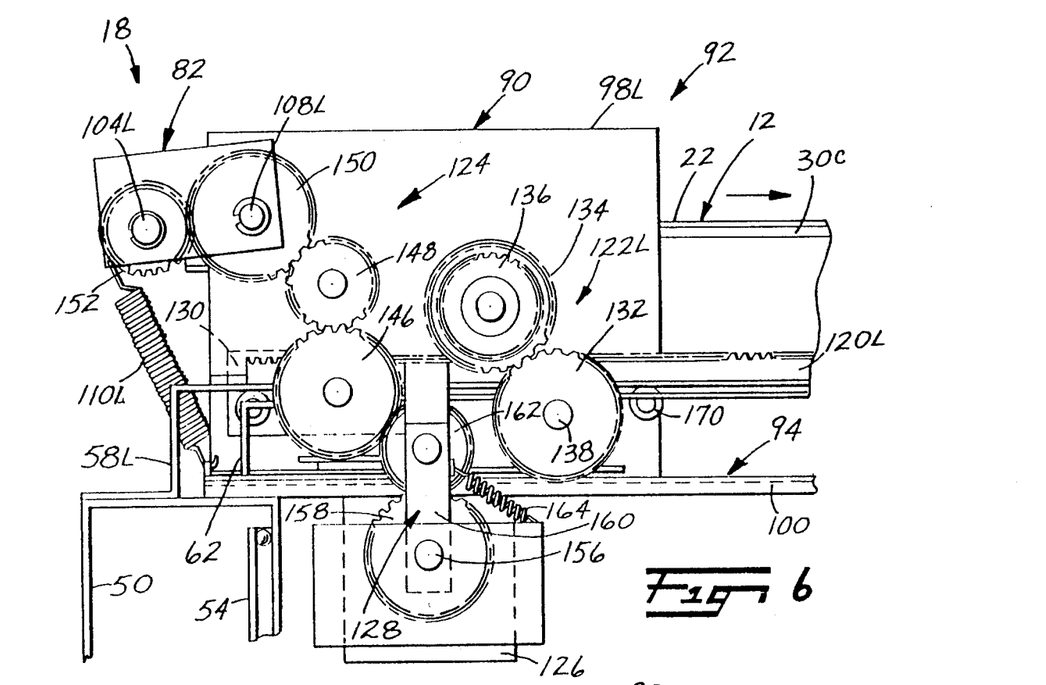
FIG. 6 is a side view of a portion of the opening/closing mechanism shown in FIG. 4.
Figure 7:
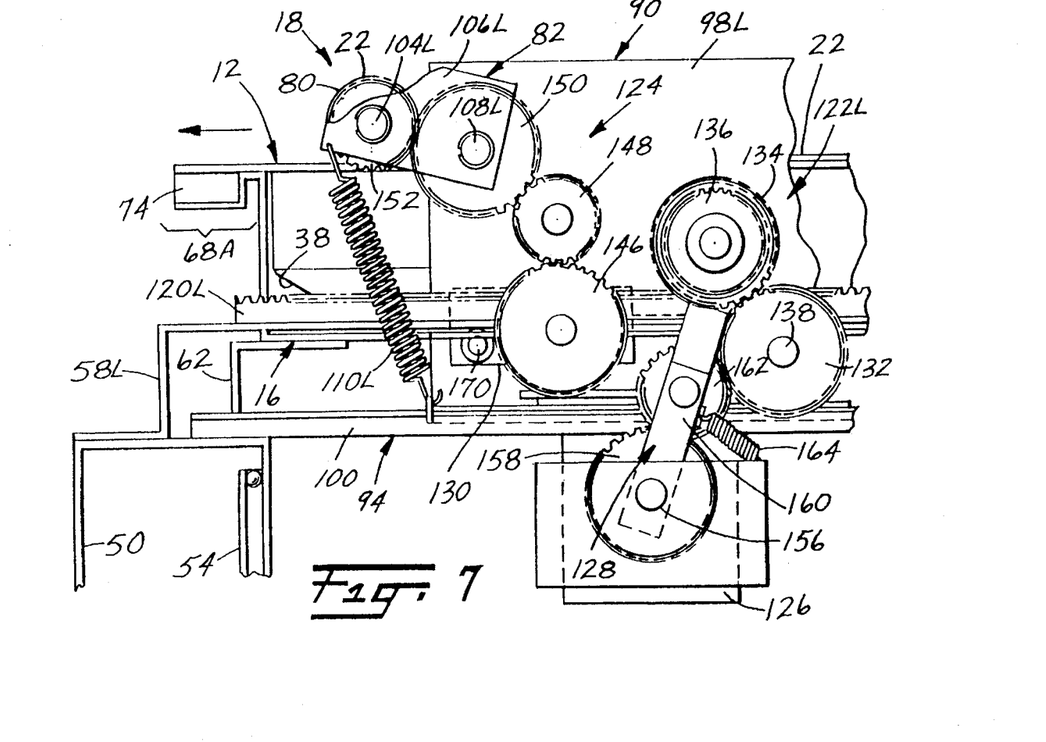
FIG. 7 is a side view of a portion of the opening/closing mechanism shown in FIG. 4, with the cover partially removed from the cartridge.

Shafts 104L and 104R extend from opposite ends of pressure roller 80 and are swingably mounted to carriage uprights 98L and 98R by brackets 106L and 106R, respectively. Shafts 104L and 104R are rotatably mounted to a forward end of brackets 106L and 106R, respectively. Rearward ends of brackets 106L and 106R, are pivotally mounted to uprights 98L and 98R, respectively, by pivot pins 108L and 108R. Pressure roller 80 is biased downwardly (toward pan lips 68A, 68C and 68D) by a pair of springs 110L and 110R. Spring 110R is connected between bracket 106R and carriage upright member 98R. Spring 110L is connected between bracket 106L and carriage upright 98L. Stop tabs (not visible) on uprights 98L and 98R engage brackets 106L and 106R, respectively, to limit the downward motion of pressure roller 80. As shown in FIG. 5A, in its lowermost position, the center of rotation of roller 80 is at the level of base lip 68A.

Carriage drive assembly 92 includes racks 120L and 120R, track drive gear assemblies 122L and 122R, roller gear drive assembly 124, drive motor 126, shuttle linkage 128, and solenoid 130. Racks 120L and 120R are mounted teeth side up to the upper sides of cross members 58L and 58R, respectively. Track drive gear assembly 122L includes transfer gears 132 and 134 and pinion gear 136. Transfer gear 134 and pinion gear 136 are coaxially mounted to one another and rotatably mounted to carriage upright 98L. Transfer gear 132 is also rotatably mounted to carriage upright 98L, and engages transfer gear 134. Pinion gear 136 engages rack 120L and drives carriage 90 with respect to base 16 in response to the rotation of gear 132. A pair of rollers 170 are rotatably mounted to both carriage uprights 98L and 98R, and engage the lower side of respective cross members 58L and 58R to distribute forces acting on carriage 90 when the carriage is driven by drive assembly 92.

Track drive gear assembly 122R is coupled to gear 132 of assembly 122L by shaft 138 (FIG. 4), and includes transfer gears 140 and 142 and pinion gear 144. Gear 140 is mounted to shaft 138, and engages gear 142. Gears 142 and 144 are coaxially mounted to one another and rotatably mounted to carriage upright 98R. Pinion gear 144 engages rack 120R. Both the left (L) and right (R) sides of carriage 90 are thereby positively and synchronously driven in response to the rotation of gear 132.

Roller gear drive assembly 124 includes gears 146, 148, 150, and 152. Gears 146, 148 and 150 are all rotatably mounted to carriage upright 98L. Gear 150 is rotatably mounted about the axis of pivot pin 108L. Gear 152 is fixedly mounted about pressure roller shaft 104L. Gears 146, 148, 150 and 152 are engaged with one another in such a manner that rotation of gear 146 causes the rotation of pressure roller 80. Since gear 150 is mounted about the axis upon which pressure roller 80 swings (i.e., pivot pin 108L), the pressure roller is positively driven at any point along its path of swinging motion.

Drive motor 126 is mounted with respect to carriage upright 98L by means of bracket 154, and has a drive gear 158 mounted to its drive shaft 156. Shuttle linkage 128 includes bracket 160 which is rotatably mounted about the axis of motor drive shaft 156, and a shuttle linkage gear 162. Gear 162 is rotatably mounted to bracket 160 and engages drive gear 158. Shuttle linkage 128 is configured in such as manner as to enable motor 126 to drive one of either carriage transfer gear 132 or roller gear 146. Spring 164 is coupled between bracket 154 and bracket 160, and biases the bracket and its linkage gear 162 toward carriage transfer gear 132. Solenoid 130 includes an actuator arm (not visible) coupled to bracket 160, and forces the bracket and its linkage gear 162 into engagement with gear 146 against the bias force of spring 164 when actuated.

The operation of opening/closing mechanism 18 can be described with reference to FIGS. 5A–5C, 6 and 7. Carriage 90 and pressure roller 80 are in the home position shown in FIGS. 5A and 6 when cartridge 12 is loaded and prior to the initiation of the cartridge opening stroke. As shown, springs 110L and 110R bias brackets 106L and 106R, respectively, in such a manner that at least a portion of pressure roller 80 is below cartridge lip 30A when the roller is in its home position. In the embodiment shown, the lip 30A of cartridge 12 extends over the wrapping portion 86 of pressure roller 80 to such an extent that apertures 46 in cartridge cover 22 are aligned with the rotational path through which fingers 88 will be driven. Roller gear drive assembly 124 is indexed in such a manner that wrapping portion 86 and fingers 88 of pressure roller 80 are positioned to enable the loading of cartridge 12 when the pressure roller is in its home position.

During the cartridge opening stroke, shuttle linkage 128 is driven against the bias force of spring 164 to force gear 162 into engagement with gear 146. Track drive gear assemblies 122L and 122R are thereby disengaged from motor 126, enabling carriage 90 to move freely about its path of motion with respect to cartridge 12. Pressure roller 80 is rotated through the linkage of gears 158, 162, 146, 148, 150 and 152 when motor 126 is actuated. During the initial rotation of roller 80, its teeth 88 will enter apertures 46 and engage cartridge cover 22 as shown in FIG. 5B. Carriage 90 does not move during this initial rotation of pressure roller 80. As cover 22 begins to be wound onto roller 80, the roller will "climb" upwardly and onto front lip 30A of cartridge 12 against the bias force of springs 110L and 110R. Continued rotation of pressure roller 80 causes cover 22 to be peeled away from cartridge tray 20, and wound onto the pressure roller. This forced winding of cover 22 onto pressure roller 80 causes carriage 90 to be "driven" or pulled rearwardly (i.e., towards rear wall 28B of cartridge 12). The opening stroke continues in this manner until pressure roller 80 has wound enough of cover 22 to open cartridge 12 to such an extent that the film (not shown) therein can be accessed. The cartridge opening stroke is discontinued by deactuating motor 126.

When it is desired to close or reseal cartridge 12, solenoid 130 is deactuated, enabling shuttle linkage 128 to force gear 162 into engagement with gear 132 of the track drive gear assembly 122L. The rotation of motor 126 thereby causes carriage 90 to be positively driven in a forward direction (i.e., toward front lip 68A of base 16) through the engagement of pinion gears 136 and 144 with racks 120L and 120R, respectively. Pressure roller 80 is disengaged from motor 126, and is free to roll during this closing stroke motion. Cover 22 is thereby unwound from pressure roller 80 and positioned over the film access opening of tray 20 during the closing stroke. Springs 110L and 110R force roller 80 to exert sufficient pressure to seal cover 22 onto tray lips 30A, 30C, and 30D. The closing stroke motion ends when pressure roller 80 has been driven back to the home position shown in FIG. 5A.

Roller drive mechanism 82' and carriage drive assembly 92', alternative embodiments of drive mechanism 82 and drive assembly 92 described above, are illustrated in FIG. 8. Roller drive mechanism 82' and carriage drive mechanism 92' perform identical functions on roller 80 and carriage 90, respectively, as their counterparts, but are configured somewhat differently. Features shown in FIG. 8 which can be substantially identical to their counterpads shown in FIGS. 4, 5A–5C, 6 and 7 are identified by identical reference numerals, while features of mechanism 82' and assembly 92' which are functionally equivalent to their counterparts are identified by common and primed (i.e., X') reference numerals.

Carriage drive assembly 92' includes rack 120' track drive gear assembly 122', roller gear drive assembly 124', drive motor 126', shuttle linkage 128' and solenoid 130'. Rack 120' is mounted teeth side down to the lower side of cross member 58L'. Cross member 58L' is positioned directly adjacent base lip 68C. Track drive gear assembly 122' includes rack engaging pinion gear 180 which is rotatably mounted to carriage upright 98L. Roller 170' is mounted to upright 98L, and engages cross member 58L' opposite rack 120' from pinion gear 180. Although only the left side of carriage drive assembly 92' is shown, the right side includes a cross member, rack, pinion gear and roller which are configured in a manner similar to their counterparts on the left side but mounted with respect to carriage upright 98R. A shaft (not shown) couples pinion gear 180 to the pinion gear on the right side.

Shuttle linkage 128' includes a gear 182 which is rotatably mounted to solenoid 130'. Carriage 90 is driven through its cartridge opening stroke by actuating solenoid 130' in such a manner as to force gear 182 into engagement with gears 158' and 150'. Motor 126' is thereby disengaged from track drive gear assembly 122'. The actuation of motor 126' with gear 182 engaged with roller gear drive assembly 124' causes roller 80 to rotate and peel cover 22 from cartridge 12 in a manner similar to that described above. When solenoid 130' is actuated to force gear 182 into engagement with gears 158' and 180, the rotation of motor 126' will drive carriage 90 through its cartridge closing stroke, resealing cover 22 onto cartridge tray 20 in a manner similar to that described above.

Film cartridge 12 and opening/closing mechanism 18 offer a number of important advantages. Since the cartridge can be resealed, cartridges bearing film of different sizes and types can be used within the imager as needed (i.e., can be resealed and removed at any time) without having to waste remaining film in any currently loaded cartridge. The opening/closing mechanism efficiently and reliably opens and reseals the cartridge. The cartridge is relatively inexpensive and easy to use, and can be disposed after all film has been imaged.

Although the present invention has been described with reference to the preferred embodiments, those skilled in the art will recognize that changes may be made in form and detail without departing from the spirit and scope of the invention. By way of example, although the cartridge has been described as opaque and inert to visible light and near IR (780 nm) (i.e., "optically opaque and photo-inert"), the cartridge can be similarly designed for use with media sensitive to radiation of other wavelengths.

What is claimed:

1. A resealable cartridge for a plurality of sheets of photographic film of the type imaged in an imaging device, comprising:

a one-piece, photo-inert and optically opaque tray including a generally planar bottom wall, front, back and side walls having upper edges, and outwardly extending lips on the upper edges of the front, back and side walls;

a flexible, rollable, photo-inert and optically opaque sheet cover for the tray having front, back and side edges, the front edge of the cover including an opening/closing mechanism-engaging structure; and a photo-inert and optically opaque pressure sensitive adhesive layer on the lips of at least the front and side walls of the tray, to provide an openable, resealable and opaque seal between the edges of the cover and lips of the tray.

2. The cartridge of claim 1 wherein the adhesive includes strips of adhesive extending along the lips of the tray.

3. The cartridge of claim 1 wherein the adhesive includes coated liquid adhesive.

4. The cartridge of claim 3 wherein the adhesive includes an emulsion based acrylic polymer adhesive.

5. The cartridge of claim 1 wherein the tray is a polymer tray.

6. The cartridge of claim 5 wherein the tray is an ABS tray.

7. The cartridge of claim 1 wherein the bottom wall of the tray includes positioning lug-receiving recesses.

8. The cartridge of claim 7 wherein the positioning lug-receiving recesses are adjacent the front wall of the tray, and the tray further includes ramped surfaces between the front wall and recesses.

9. The cartridge of claim 1 wherein the bottom wall of the tray includes a media presence monitoring well.

10. The cartridge of claim 1 wherein the opening/closing mechanism-engaging structure includes one or more apertures through the front edge of the cover.

11. The cartridge of claim 1 wherein the lip on the front wall of the tray includes spaced cutouts; and the front edge of the cover includes opening/closing mechanism-engaging apertures overlying the cutouts in the tray lip.

12. The cartridge of claim 1 wherein the cover includes a sheet of polymer material.

13. The cartridge of claim 12 wherein the cover includes laminated metal foil and polymer sheet material.

14. A resealable cartridge for a plurality of sheets of photosensitive media, comprising:

a photo-inert and optically opaque media-receiving tray having a media access opening;

a flexible, photo-inert and optically opaque cover for the media access opening; and a photo-inert and optically opaque seal between the tray and cover, the seal including an openable and resealable adhesive layer seal between at least portions of the cover and tray.

15. The cartridge of claim 14 wherein:

the tray includes bottom, front, back and side walls having edges defining the media access opening;

the cover includes front, back and side edges; and the seal includes adhesive for providing an openable and resealable seal between the front edges and at least portions of the side edges of the cover and tray.

16. The cartridge of claim 15 wherein:

the tray includes lips extending from the front wall edge and at least the portions of the side wall edges; and the adhesive seal is between the lips of the tray and the edges of the cover.

17. The cartridge of claim 15 wherein the adhesive seal includes pressure sensitive adhesive.

18. The cartridge of claim 15 wherein the adhesive seal includes strips of adhesive extending around the access opening on the edges of the front, back and side walls of the tray.

19. The cartridge of claim 18, wherein the adhesive seal includes pressure sensitive adhesive.

20. The cartridge of claim 15 wherein the adhesive seal includes coated liquid adhesive.

21. The cartridge of claim 20 wherein the coated liquid adhesive is an emulsion based acrylic polymer adhesive.

22. The cartridge of claim 14 wherein the tray is a one-piece polymer tray.

23. The cartridge of claim 14 wherein the tray is an ABS tray.

24. The cartridge of claim 15 wherein the bottom wall of the tray includes positioning lug-receiving recesses.

25. The cartridge of claim 24 wherein the positioning lug-receiving recesses are adjacent the front wall of the tray, and the tray further includes ramped surfaces between the front wall and recesses.

26. The cartridge of claim 15 wherein the bottom wall of the tray includes a generally planar media supporting surface with a media presence monitoring well.

27. The cartridge of claim 14 wherein the cover includes an opening/closing mechanism-engaging structure.

28. The cartridge of claim 27 wherein the opening/closing mechanism-engaging structure includes one or more apertures through the cover.

29. The cartridge of claim 27 wherein the cover further including a reinforcing strip adjacent the opening/closing mechanism-engaging structure.

30. The cartridge of claim 16 wherein the lip of the front wall of the tray includes spaced cutouts; and the front edge of the cover includes opening/closing mechanism-engaging apertures overlying the cutouts in the tray lip.

31. The cartridge of claim 14 wherein the cover includes a rollable sheet of polymer material.

32. The cartridge of claim 14 wherein the cover includes a rollable laminated metal foil and polymer sheet.

* * * * *